(12) United States Patent
Mileti

(10) Patent No.: US 8,919,613 B2
(45) Date of Patent: Dec. 30, 2014

(54) METERED DISPENSING SYSTEM WITH STEPPED FLANGE INTERFACE

(75) Inventor: Robert J. Mileti, Torrington, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 390 days.

(21) Appl. No.: 13/082,015

(22) Filed: Apr. 7, 2011

(65) Prior Publication Data

US 2011/0248049 A1    Oct. 13, 2011

Related U.S. Application Data

(60) Provisional application No. 61/321,590, filed on Apr. 7, 2010.

(51) Int. Cl.
*B65D 37/00* (2006.01)
*G01F 11/08* (2006.01)

(52) U.S. Cl.
CPC ...................................... *G01F 11/08* (2013.01)
USPC .......... 222/207; 222/105; 222/209; 222/383.1

(58) Field of Classification Search
CPC ............... A45D 2200/056; A45D 2200/1045; A45D 34/04; A47K 5/1208; A47K 7/03; A47L 13/17; B05B 11/0043; B05B 11/3028; B05B 11/3032; B05B 11/3033; B05C 17/00569; B05C 17/00583; G01F 11/025; G01F 11/08; G01F 11/082; G01F 11/084; G01F 11/288; F16J 3/02; F04B 43/0063
USPC ........ 222/94, 135, 207, 372, 213, 373, 383.1, 222/105, 72, 163, 286, 304, 306, 440, 209; 417/480; 401/188 R, 205
See application file for complete search history.

(56) References Cited

U.S. PATENT DOCUMENTS

| | | | |
|---|---|---|---|
| 3,817,420 A * | 6/1974 | Heisler | 220/790 |
| 3,892,351 A * | 7/1975 | Johnson et al. | 206/508 |
| 3,934,749 A * | 1/1976 | Andrulionis | 220/256.1 |
| 4,215,797 A * | 8/1980 | Chen | 220/359.4 |
| 5,074,765 A | 12/1991 | Pekar | |
| 6,394,316 B1 * | 5/2002 | Daansen | 222/207 |
| 6,619,512 B1 * | 9/2003 | Sayers et al. | 222/207 |
| 6,789,354 B2 * | 9/2004 | Wells | 47/57.5 |
| 7,419,322 B2 | 9/2008 | Laflamme et al. | |
| 7,997,454 B2 * | 8/2011 | LaFlamme et al. | 222/207 |
| 8,061,566 B2 * | 11/2011 | LaFlamme et al. | 222/207 |

(Continued)

OTHER PUBLICATIONS

International Search Report and Written Opinion of the International Searching Authority; PCT/US2011/031528; May 27, 2011; 8 pages.

*Primary Examiner* — Patrick M Buechner
(74) *Attorney, Agent, or Firm* — St. Onge Steward Johnston & Reens LLC

(57) ABSTRACT

A fluid dispensing device has a container made from a flexible material defining an interior fluid storage region and a flexible metering housing having a metering chamber in fluid communication with the fluid storage region, the flexible metering housing having a button heat sealed to a base plate. A unidirectional intake valve is disposed between the container and the flexible metering housing. A unidirectional output valve is in fluid communication with the flexible metering housing. The button has a stepped flange towards an outer edge of said circular shape and the base plate has a stepped flange corresponding to the stepped flange of the button.

16 Claims, 8 Drawing Sheets

(56) References Cited

U.S. PATENT DOCUMENTS

| | | | |
|---|---|---|---|
| 8,083,103 B2* | 12/2011 | LaFlamme et al. | 222/135 |
| 8,123,073 B2* | 2/2012 | LaFlamme et al. | 222/1 |
| 8,132,696 B2* | 3/2012 | Mileti | 222/207 |
| 8,292,120 B2* | 10/2012 | LaFlamme et al. | 222/94 |
| 2008/0069628 A1* | 3/2008 | LaFlamme et al. | 401/205 |
| 2008/0149666 A1* | 6/2008 | LaFlamme et al. | 222/105 |
| 2008/0190958 A1* | 8/2008 | Wyner et al. | 222/135 |
| 2008/0190961 A1* | 8/2008 | Wyner et al. | 222/207 |
| 2008/0193198 A1* | 8/2008 | LaFlamme et al. | 401/205 |
| 2008/0203110 A1* | 8/2008 | LaFlamme et al. | 222/135 |
| 2008/0203114 A1* | 8/2008 | LaFlamme et al. | 222/207 |
| 2008/0203115 A1* | 8/2008 | LaFlamme et al. | 222/207 |
| 2008/0205965 A1* | 8/2008 | LaFlamme et al. | 401/6 |
| 2008/0205970 A1* | 8/2008 | LaFlamme et al. | 401/205 |
| 2008/0205972 A1* | 8/2008 | LaFlamme et al. | 401/270 |
| 2008/0223875 A1* | 9/2008 | LaFlamme et al. | 222/135 |
| 2008/0237262 A1* | 10/2008 | LaFlamme et al. | 222/135 |
| 2008/0264972 A1* | 10/2008 | LaFlamme et al. | 222/207 |
| 2008/0264973 A1* | 10/2008 | LaFlamme et al. | 222/207 |
| 2009/0183371 A1 | 7/2009 | Mileti et al. | |
| 2009/0263176 A1* | 10/2009 | Mileti et al. | 401/184 |
| 2010/0147892 A1* | 6/2010 | LaFlamme et al. | 222/207 |
| 2010/0320226 A1* | 12/2010 | Nilsson | 222/1 |
| 2011/0017774 A1* | 1/2011 | Pritchard | 222/82 |
| 2011/0031278 A1* | 2/2011 | Han de Man | 222/207 |
| 2011/0248050 A1* | 10/2011 | Mileti | 222/207 |

* cited by examiner

METERED DISPENSING SYSTEM WITH STEPPED FLANGE INTERFACE

CROSS-REFERENCE TO RELATED APPLICATIONS

The present application claims the benefit under 35 U.S.C. §119(e) of U.S. Provisional Patent Application Ser. No. 61/321,590 filed on Apr. 7, 2010, the content of which is incorporated herein by reference.

FIELD OF THE INVENTION

This invention relates generally to dispensing devices and packages. More specifically, the present invention relates to metering devices that can controllably dispense fluid media from a source of fluid media, such as a liquid, and methods for creating same.

BACKGROUND OF THE INVENTION

Various types of fluid material and media are employed for different purposes throughout commerce and industry. For example, there are various products in the areas of personal care, home care, air care, transportation care and food industries that require a fluid material to be dispensed in some manner from a source of such material. Further, when this material is sold in commerce, it must be contained and stored in some type of container while awaiting use. Ultimately, when that product is used, it must be dispensed from its storage container to the desired location for use.

In the prior art, there are many different types of dispensers that are employed for the delivery of a stored fluid material to its desired location for use. For example, a storage container having a flexible body with a nozzle tip extending therefrom is commonly provided for such a purpose. An example of such use can be seen in the context of a ketchup dispenser, where a user squeezes the container body to urge the fluid material (i.e., ketchup) out from container body and through the nozzle tip to accurately deposit the fluid material at the desired location. In such an application, the amount of fluid that is ultimately delivered is determined by how much the user actually squeezes the container body. While this method has provided marginally acceptable results, this method also typically yields an erratic fluid volume since more or less fluid material may be delivered on each successive squeeze of the container body. Also, the container must be held upright to avoid leakage because no valves are employed in the fluid nozzle tip.

In another example of a prior art dispensing device, a flexible container is provided that holds a volume of fluid material to be delivered. In an attempt to overcome the leakage issue noted above, a single one-way check valve is provided at the exit port of the flexible container. When the flexible body is squeezed, the material is urged out under pressure through the valve. The difficulty here is that the valve, over time, becomes partially clogged, thereby requiring that the user apply additional pressure to cause the valve to open. As a result, once the valve opens, the additional pressure causes more fluid material to be deposited than the user typically would have desired.

U.S. Pat. No. 7,419,322 represents a significant advancement over the above-described systems by providing a fluid dispensing device (10) that includes a container (20) with an interior fluid storage region (22) therein. A flexible metering housing (26) defined by a button (36) and a base plate (34) is disposed in fluid communication with the fluid storage region (22) with a first one-way valve (30) disposed between the container (20) and the flexible metering housing (26). One-way flow from the interior fluid storage region (22) of the container (20) fills the predetermined volume of the metering chamber (32) with fluid by vacuum action when the button (36) is depressed and then released. A second valve (40) is in fluid communication with the metering housing (26) and permits one-way fluid flow from the metering chamber (32) to the exterior outer region of the container (20) when the metering housing (26) is depressed again. Each time the metering housing (26) is depressed a substantially equal volume of fluid (24) is dispensed from the container (20).

U.S. Patent Application Publication No. 2008/0264973 relates to a similar concept, but discloses several additional embodiments that possess a simplified design as compared to those disclosed in U.S. Pat. No. 7,419,322, wherein the valving and dispensing functions are incorporated into a design that is relatively simplified and cost-effective to produce, yet that also provides excellent results. However, one thing that all embodiments in both references share in common is that a button or the like (36, 312, 404, 508, 608) and a base plate or the like (34, 314, 410, 502, 602) are heat sealed together, with or without some additional element disposed therebetween.

While the configuration and operation of these metering pump assemblies provides excellent results, and while the heretofore known methods used to manufacture these metering pump assemblies have proven more than satisfactory, it has been found that in some situations, it may be desirable to seal the button or the like (36, 312, 404, 508, 608) and the base plate or the like (34, 314, 410, 502, 602) together in a lesser amount of time than has heretofore been achieved.

SUMMARY OF THE INVENTION

The present invention preserves the advantages of prior art dispensing devices. In addition, it provides new advantages not found in currently available devices and overcomes many disadvantages of such currently available devices.

These and other objects of the present invention are achieved by provision of a fluid dispensing device has a container made from a flexible material defining an interior fluid storage region and a flexible metering housing having a metering chamber in fluid communication with the fluid storage region, the flexible metering housing having a button heat sealed to a base plate. A unidirectional intake valve is disposed between the container and the flexible metering housing. A unidirectional output valve is in fluid communication with the flexible metering housing. The button has a stepped flange towards an outer edge of said circular shape and the base plate has a stepped flange corresponding to the stepped flange of the button.

In some of these embodiments, the stepped flange of the button decreases in thickness towards the edge of the circular shape. In some of these embodiments, the stepped flange of said button increases in thickness towards the edge of the circular shape. In some of these embodiments, a thickness of the base plate at an outer periphery is about 0.010 inches thick. In some of these embodiments, the stepped flange of the button has at least 2 steps. In some of these embodiments, the unidirectional output valve is connected to a fluid conduit which is connected to an exit port of the fluid dispensing device. In some of these embodiments, the output valve is on an opposite side of the fluid dispenser as the flexible metering housing. In some of these embodiments, the unidirectional output valve is connected to a plurality of fluid conduits, the plurality of fluid conduits connected to a plurality of exit ports. In some of these embodiments, the unidirectional intake valve and the unidirectional output valve are one-way check valves. In some of these embodiments, the button is substantially circular in shape.

In another embodiment of the present invention is a fluid dispensing device having a container made from a flexible material defining an interior fluid storage region, a base plate connected to the container, and a substantially circular shaped button heat sealed to the container, the button and the base plate form a flexible metering housing having a metering chamber in fluid communication with the fluid storage region. A unidirectional intake valve disposed between the container and the flexible metering housing permitting the flow of the fluid from the fluid storage region to the metering housing. A unidirectional output valve is in fluid communication with the flexible metering housing permitting the flow of fluid from the metering housing to an exterior of the container. The button has a stepped flange towards an outer edge of the circular shape, and the base plate has a stepped flange corresponding to the stepped flange of the button.

In some of these embodiments, the stepped flange of the button decreases in thickness towards the edge of the circular shape. In some of these embodiments, the stepped flange of the button increases in thickness towards the edge of the circular shape. In some of these embodiments, the thickness of the base plate at an outer periphery is about 0.010 inches thick. In some of these embodiments, the stepped flange of the button has at least 2 steps. In some of these embodiments, the unidirectional output valve is connected to a fluid conduit which is connected to an exit port of the fluid dispensing device. In some of these embodiments, the output valve is on an opposite side of the fluid dispenser as the flexible metering housing. In some of these embodiments, the unidirectional output valve is connected to a plurality of fluid conduits, the plurality of fluid conduits connected to a plurality of exit ports. In some of these embodiments, the unidirectional intake valve and the unidirectional output valve are one-way check valves. In some of these embodiments, further comprising a strap connected to said container.

DETAILED DESCRIPTION OF THE INVENTION

Figure 1:
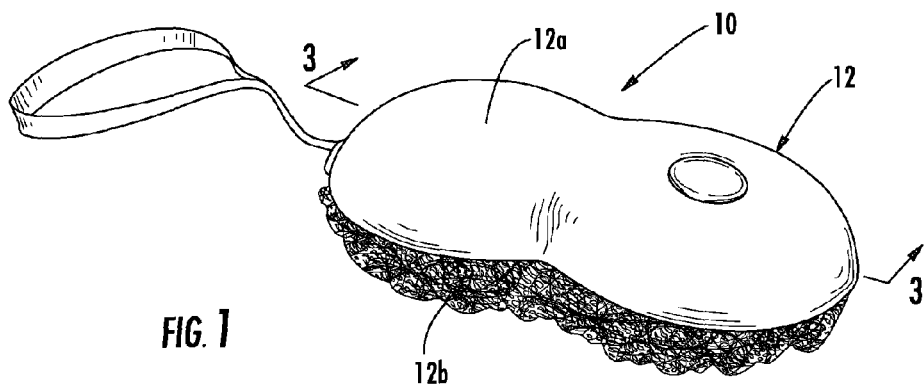
FIG. 1 is a top perspective view of a first embodiment of the dispensing device of the present invention.

U.S. Pat. No. 7,419,322 and U.S. Patent Publication No. 2008/0264973 are hereby incorporated by reference.

The exemplary embodiments of the present invention may be further understood with reference to the following description and the related appended drawings, wherein like elements are provided with the same reference numerals. The exemplary embodiments of the present invention are related to a metered dispensing device with a reduced heat-seal-cool cycle time. Specifically, the metered dispensing device has a modified button which allows for a quicker heat seal, which reduces the manufacturing time of each metered device.

Figure 2:
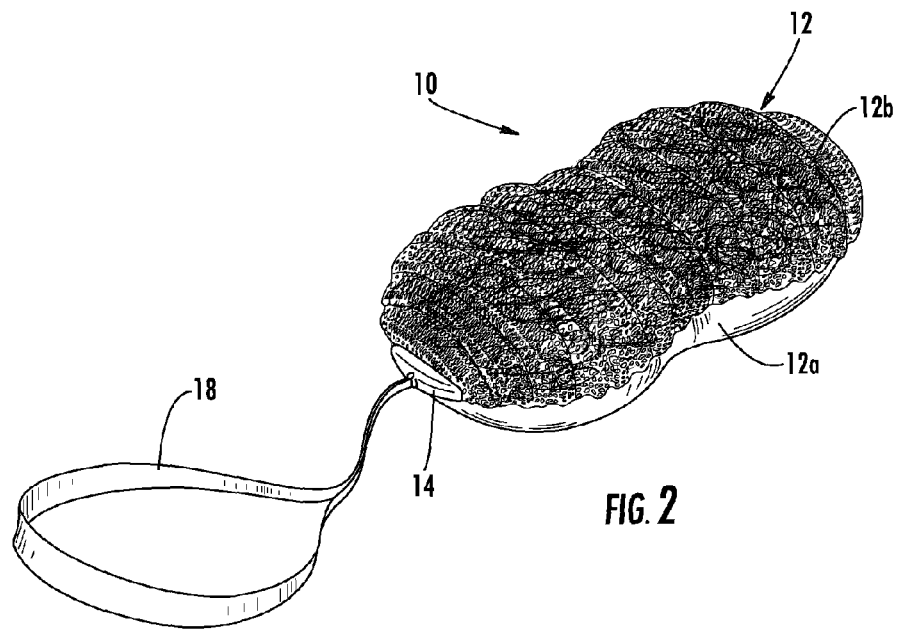
FIG. 2 is a bottom perspective view of the dispensing device of FIG. 2.

Referring first to FIGS. 1 and 2, the dispensing device 10 of the present invention is shown to include an outer covering, generally referred to as 12 which serves as an applicator material. This applicator material 12b can be formed of any type of material to suit the application at hand. For example, as seen in FIGS. 1 and 2, the cover 12 is preferably formed of two different types of material 12a and 12b to serve two purposes when in use. Preferably, the top section 12a is of a foam material while the bottom section 12b is of a mesh or "pouf" material. The top section 12a can be secured to the bottom section 12b by, for example, welding. A snap-fit cover 14 seals a re-fill port 16, as will be described in more detail in connection with FIG. 3. A hang strap or cord 18 can also be provided. The configuration of the applicator 12 is just one of many different types of applications of the present invention which will be discussed in more detail below. It is also possible that applicator materials 12 and 12b can be omitted if the intended purpose of the device is to only dispense fluid rather than to dispense and also assist in applying it.

Figure 3:
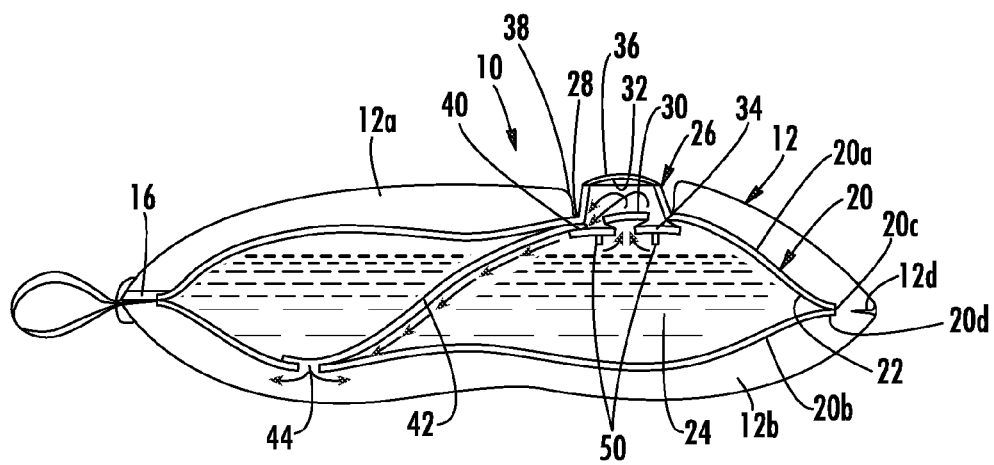
FIG. 3 is a cross-sectional view through the line 3-3 of FIG. 1.

Turning now to FIG. 3, a cross-sectional view through the line 3-3 of FIG. 1 is shown to illustrate the internal construction of an embodiment of the dispensing device 10 of the present invention. A container body 20 is provided which includes a fluid storage region 22 that contains a volume of fluid material 24 therein. The container 20 is preferably made of a flexible material, such as plastic or nylon. Thus, as fluid material 24 is evacuated from within the container body 20, it will collapse gradually for a compact structure.

A metering housing 26 is provided at a first opening 28 of the container body 20. The metering housing 26 includes an intake one-way valve 30, such as a check valve, to pull fluid 24 from the fluid storage region 22 of the container body 20 into a metering chamber 32 of a predetermined size. It should be noted that any type of valve can be used to suit the given application. The intake valve 30 is positioned in a base plate 34 of the metering housing 26. Thus, fluid 24 can only flow in one direction, namely from the fluid storage region 22 into the metering chamber 32. The metering chamber 32 is defined by a flexible membrane 36 in the form of a button or bulb which is accessible and manipulatable through a gap 38 in the applicator material 12. The button 36, which is also known as a dome pump, may be clear to provide an indicator to the consumer when the metered dosage of fluid material 24 is ready for delivery.

An output valve 40 is provided in fluid communication with the metering chamber 32 of the metering housing 26. Thus, the fluid residing in the metering chamber can only exit through the output valve 40. Also, a fluid conduit 42 is also provided to direct the exit of fluid 24 at any location through the container body. Preferably, as seen in FIG. 3, the fluid conduit 42 connects the output valve 40 of the metering housing 26 to an exit port 44 located on the bottom of the container body. This permits the metering housing 26 to be on an opposite side as the side through which the fluid 24 exits. It should be noted that the fluid conduit 42 can be directed and located to exit at any point through the container body 20 depending on the application at hand. Also, the output valve 40 may be located at the exit port 44, as an alternative, depending on the requirements of the application. The output valve 40 may be a flattened tube of material or two portions of material secured together.

Button 36 of the metering housing 26 is depressed to initiate a vacuum operation. More specifically, when the button 36 is further released, fluid 24 is pulled from the fluid storage region 22 of the container body 20 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed and the application therefore and the desired dosage volume.

Further depression of the button or dome pump 36 urges the measured volume of fluid 24 within the metering chamber 32 out through the output valve 40 of the metering housing 26. This known amount of fluid material 24 is then either directly routed to an optional applicator 12 for use or through a fluid conduit 42, as seen in FIG. 3, for more targeted introduction into the applicator 12. In this case, it is preferred that the metered volume of fluid material 24 be routed to the bottom of the container body 20 for dispersion into the applicator portion 12b on the bottom surface thereof. For example, this configuration is particularly well-suited for dispensing body wash for bathing purposes. Other applications may require different exits and introduction locations into the applicator material 12. For example, the exit location of the liquid may be on the same side of the device 10 as the dome pump. This is particularly useful when the device 10 is intended solely for dispensing fluid without the use of an applicator 12.

Figure 4:
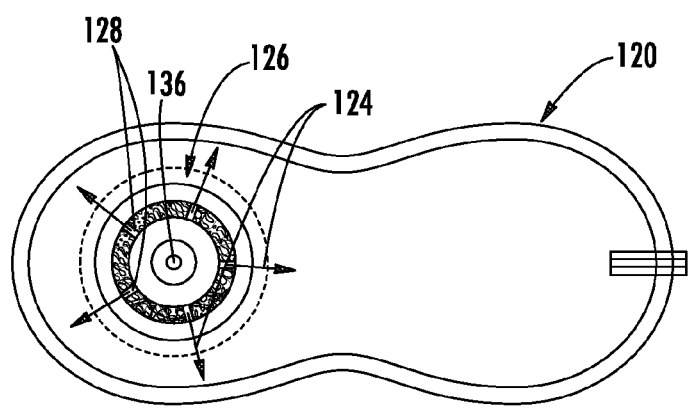
FIG. 4 is a top plan view of an alternative embodiment of the present invention.

In FIG. 4, an alternative construction of the container 120 with modified metering housing 126 is shown. In this embodiment, an array of output valves 128 are positioned radially about the periphery of the metering housing 126 to deliver fluid material 124 directly to the applicator material (not shown in FIG. 4 for ease of explanation) on the same side thereof without employing a fluid conduit 42 that is routed through the interior of the container body 20. This radial delivery pattern is well-suited for use in application devices requiring simultaneous dispersion of contents around the metering housing, such as for applying skin conditioner.

Figure 5:
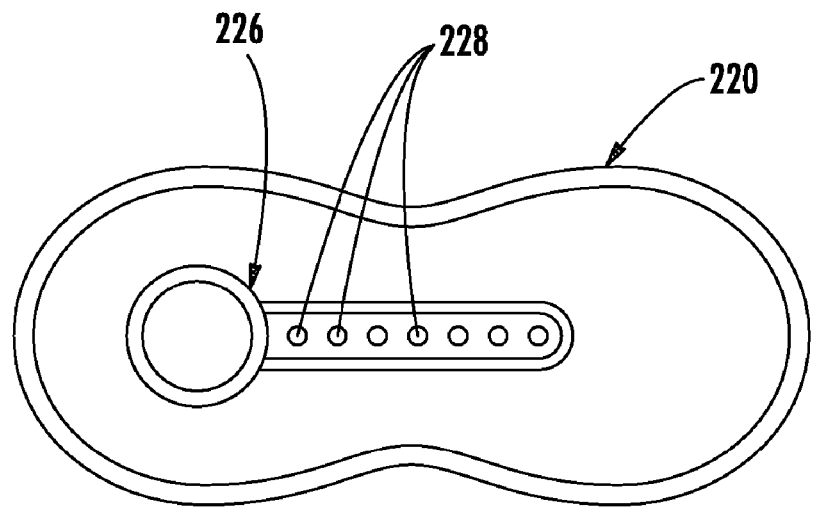
FIG. 5 is a top plan view of another alternative embodiment of the present invention.

FIG. 5 illustrates another alternative construction of a container 220 with modified metering housing 226 of the present invention where an array of output valves 228 is positioned linearly across the top surface of the container body 220 to deliver fluid material directly to the applicator material (not shown in FIG. 5 for ease of explanation) on the same side thereof without employing a fluid conduit. This linear delivery pattern is well-suited for use as an applicator that applies fluid in a linear stroke-based manner along the longitudinal axis of the device.

In accordance with the present invention, the direction of the delivery of the fluid material 24 can be easily modified to suit the application at hand. In certain applications, it is desirable that the applicator material 12, located on the top and the bottom of the container body 20, receive fluid material in an evenly distributed fashion. As shown above, the fluid material 24 can be directed out from any location on the container 20 to deliver the fluid as desired. It is frequently desirable that the fluid 24 be able to passively flow from one side 20a of the container 20 to the opposing side 20b of the container 20, particularly at the edges 20c thereof.

Referring back to FIG. 1, an efficient method of manufacturing a quality dispensing device 10 is to employ heat welding to construct the container 20 and the applicator material 12 thereon. For example, a top portion 20a is typically heat welded to a bottom portion 20b about their periphery 20c to form a container 20 with an interior fluid storage region 22 therein. The applicator material 12 is similarly secured to the container 20 by heat welding or other similar processes, such as gluing, either about its periphery or its entire contact surface with the container 20.

Use of a heat welding seam 20d about the periphery 20c of the container 20 is employed to reduce the flow and wicking action of the fluid 24 in the applicator material 12a on one side to the applicator material 12b on the other side and vice versa. Thus, fluid 24 must travel over the seam 20d of the container and seam 12d of the applicator material 12 to be present on the opposing side. Seams 12d and 20d prevent the fluid 24 from freely flowing from the front of the container 20 to the back and vice versa.

Figure 6:
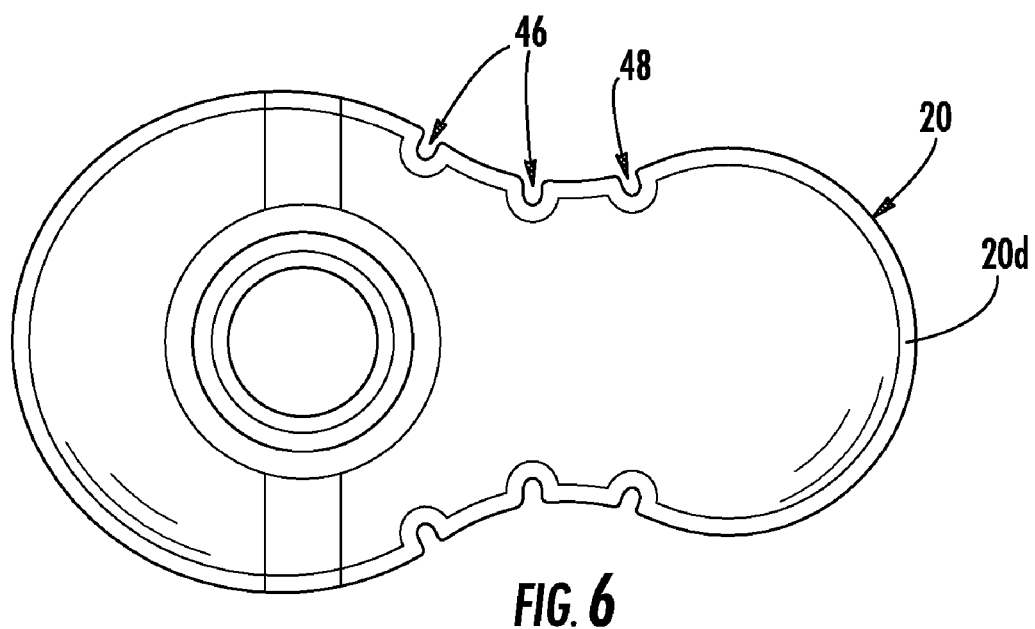
FIG. 6 is a top plan view of another embodiment of the dispensing device of the present invention showing flow enhancing notches.

FIG. 6 illustrates a further modification to the container 20 which is within the scope of the present invention to address the problem indicated above. More specifically, a number of notches 46 are formed in the peripheral edge 20d of the container 20 to permit flow of fluid material 24 easily from one side of the container 20 to the other. When the applicator material 12 is heat sealed to the container at its peripheral edge to form a seam 12d, a number of pass-through apertures 48 are formed between the seam 20d, 12d and the applicator material 12 to permit free flowing travel of fluid material 24 from one side of the device 10 to the other and back without having to travel over the peripheral seams 12d and 20d.

The applicator material 12 can be foam, such as open cell foam, fabric, blended material, co-extruded material and combinations thereof. It should be understood that these materials are just examples of the types of materials that can be used in connection with the dispenser 10 of the present invention; the specific material is determined by the given application and the type of material to be dispensed.

When fluid material 24 is dispensed within the foam, the fluid 24 will tend to equilibrate the moisture by moving the moisture from a point of high moisture to a point of low moisture. This wicking action causes the fluid 24 to naturally propagate through the applicator material 12. Since there is an absence of applicator material 12 at the periphery, the notches 46 and pass-through apertures 48, of FIG. 6, facilitate the wicking action from one side of the device 10 to the other, if necessary in that application.

Non-woven materials or fibers may also be employed as the material for the applicator 12 on one or both sides of the device. For example, reticulated foam may also be employed. These materials are well-suited as applicators 12 for more harsh chemicals, such as tire cleaner and paint remover where toughness is required. Also, more abrasive material can be provided on one side of the device for more aggressive cleaning, for example, while the opposing side has a polishing type surface.

In general, the size, density and wicking action of the cells and overall size of the applicator 12 can be modified to suit the particular fluid to be applied. The foregoing applicators can be incorporated into any of the embodiments of the present invention regardless of whether the material exits on the same side of the container 20 as the pump.

Figure 7:
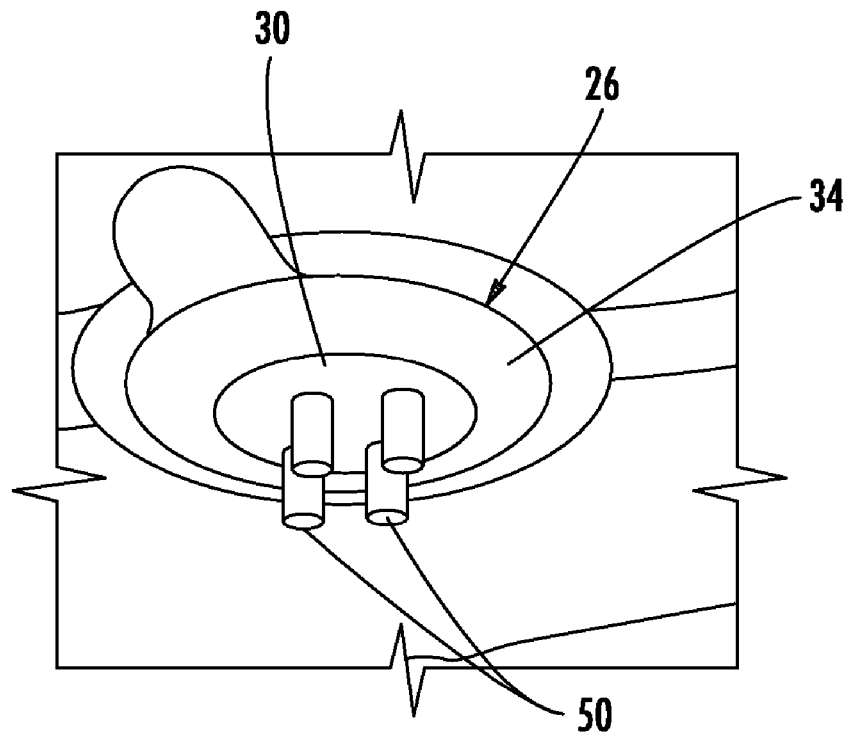
FIG. 7 is a close-up perspective view of the metering housing with stand-off legs on the bottom of the dividing plate of the pumping mechanism.
Figure 8:
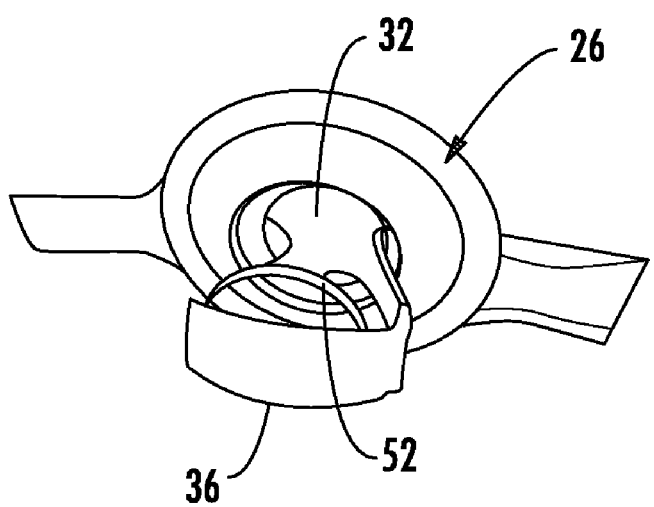
FIG. 8 is a close-up perspective view of the metering housing with coil spring.

Turning now to FIGS. 1, 7 and 8, further enhancements to the metering housing 26 construction are shown in detail. As seen in FIGS. 1 and 7, a number of stand-off legs 50 emanate downwardly from the base plate 34 of the metering housing 26. These legs 50 prevent the base plate 34 from completely bottoming out and blocking the flow of fluid material 24 into the intake valve 30. The stand-off legs 50 are particularly useful when the volume of fluid material 24 left in the container 20 is running low and the container 20 is becoming relative flat in configuration. In this situation, there is a possibility that the aforesaid bottoming out may occur. However, the use of the stand-off legs 50 of FIGS. 1 and 7 prevent this from occurring.

FIG. 8, with reference back to FIG. 1, illustrates a further modification of the metering housing 26 to ensure that maximum suction is achieved and that the entire metering chamber 32 is filled upon each depression and release of the button 36. A spring-biasing structure 52 resides within the button or bulb structure 36 of the metering housing 26. Thus, the button 36 recovers quickly while providing a strong suction or vacuum to fill the interior of the metering chamber 32 with the desired metered volume of fluid material 24. A coil spring is preferred for the spring-biasing structure 52 but other spring-biasing structures, such as leaf springs and foam material, may be employed for this purpose.

Figure 9:
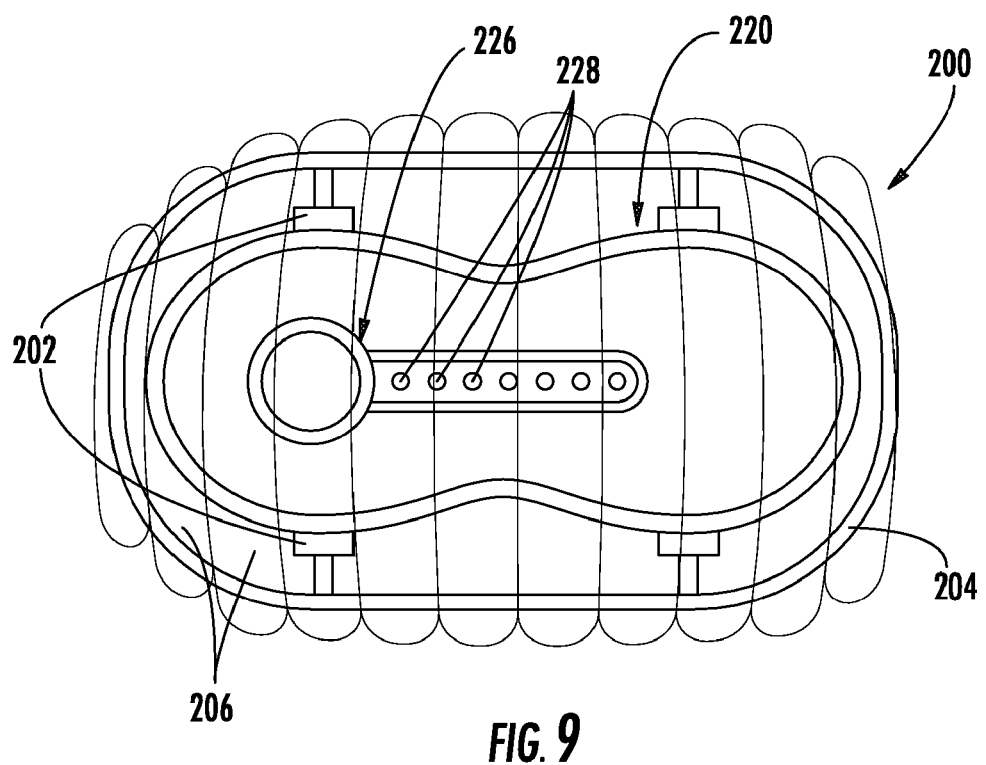
FIG. 9 is a top plan view of another alternative embodiment of the present invention.

FIG. 9 illustrates yet a further alternative embodiment 200 of the present invention where a container, such as container 220, includes a series of tabs 202 that emanate outwardly from the container 220. An outer frame or skeleton 204 is connected to the container 220 via the tabs 202. Applicator material 206, such as "pouf" or fabric material is then attached to the frame 204 with the container 220 residing therein. This embodiment 200 is particularly well-suited to permit free flowing of fluid material about the dispenser 200.

Figure 10:
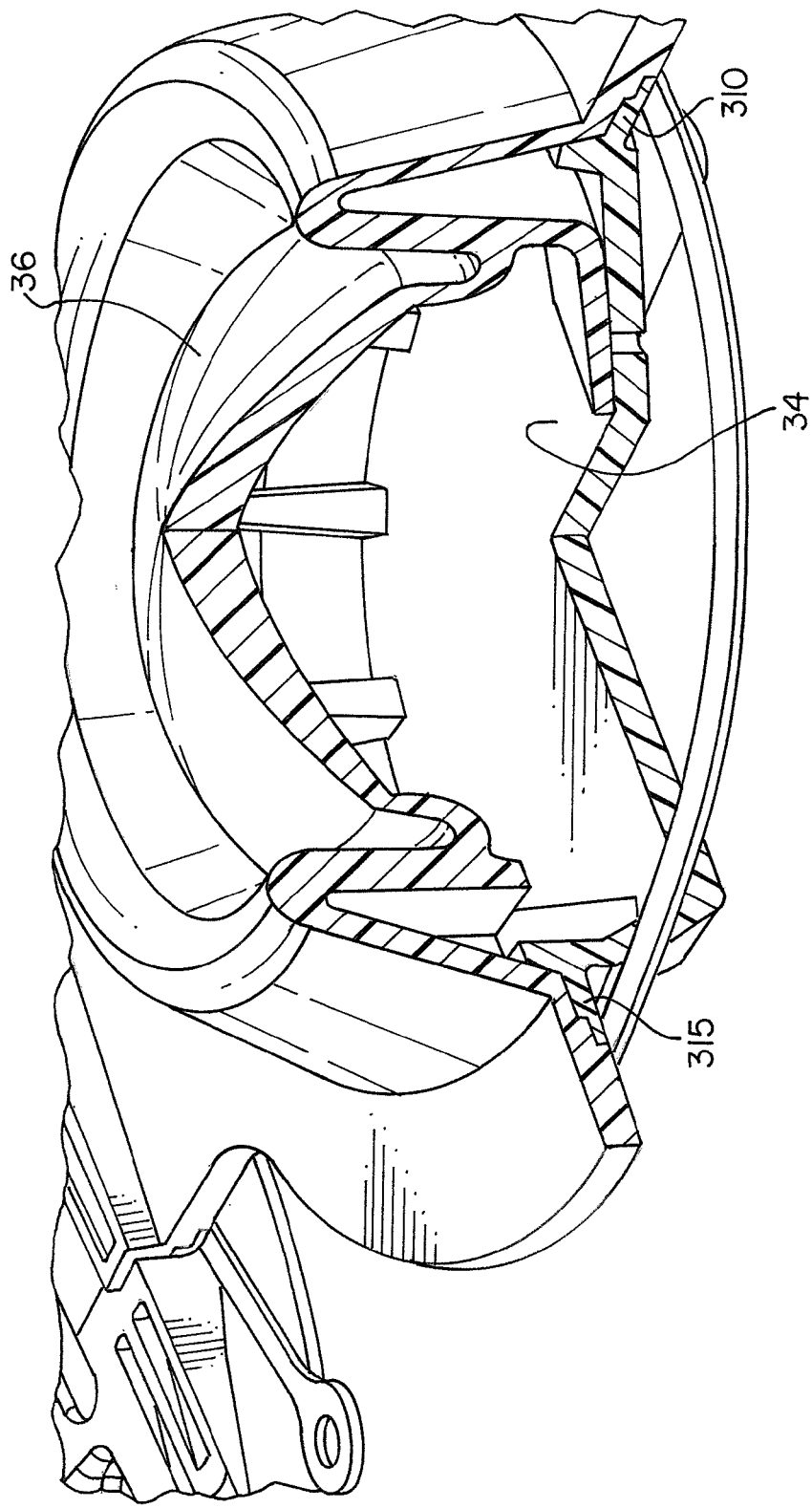
FIG. 10 is a partially exposed view of a button according to the present invention.
Figure 11:
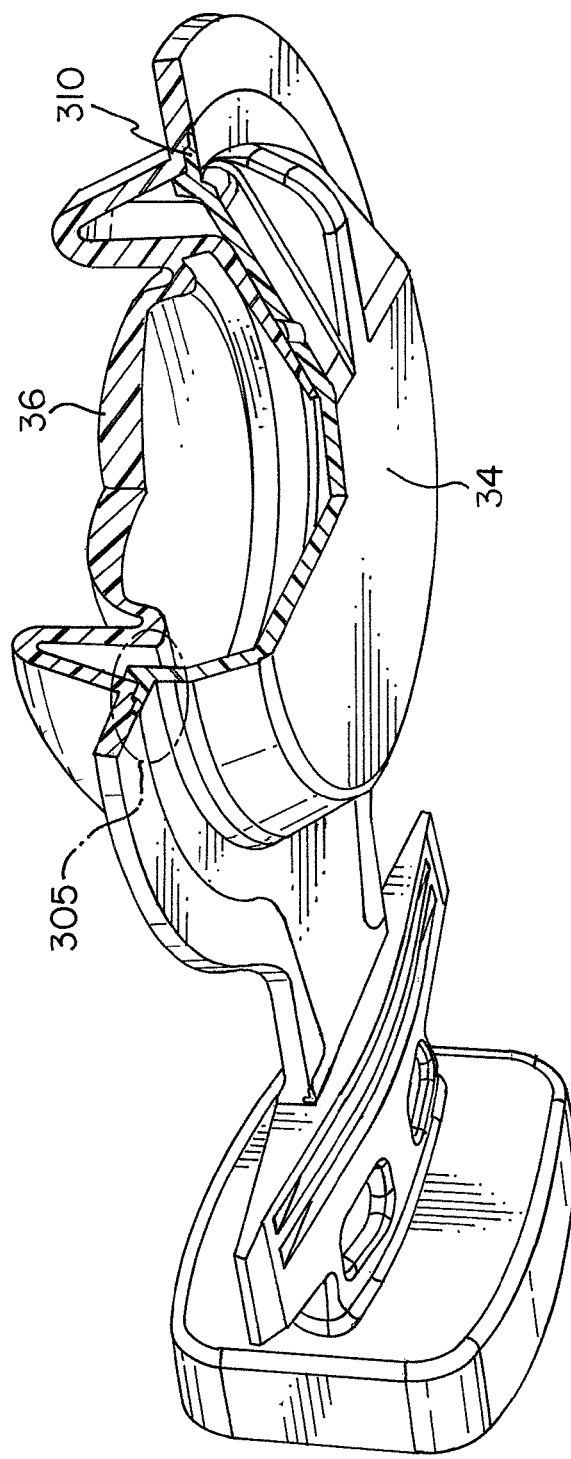
FIG. 11 is a partially exposed close-up view of the button from FIG. 10.

As best seen in FIGS. 10 and 11, partially exposed views of a button 36 according to the present invention are shown. Prior art dispensing systems require at least 4 seconds when sealing the button and the base plate together. While this cycle time is not exorbitant, a lower cycle time is beneficial to increase throughput of the machinery used to mass produce the metering pump assemblies. It was found that modifications to button 36 and base plate 34 could significantly reduce the heat seal time for each metered dispensing device.

Button 36 is heat sealed to base plate 34 at the periphery 310 of base plate 34 such that button 36 covers the outside diameter of base plate 36. See circled area 305 and FIG. 11. A "stepped flange" 315 interfaces between button 36 and base plate 34, which reduces the cross section in the seal area by approximately half. It should be noted that while FIGS. 10 and 11 show a reduction of approximately half, any reduction can be designed of greater than or less than half of the thickness without affecting any of the "functional" design areas. Additionally, while a stepped flange configuration is shown, the metered dispensing device may be designed with a non-stepped flange, which can still reduce the heat seal time while maintaining the structure of the device.

In an exemplary embodiment, the thickness of the base plate at its outermost 0.030 inches of periphery can be reduced from 0.020 inches to 0.010 inches. While these specific dimensions are exemplary only, they illustrate the basic inventive concept of the invention. A greater or lesser thickness reduction over a greater or lesser extent of the periphery is also contemplated.

Figure 10B:
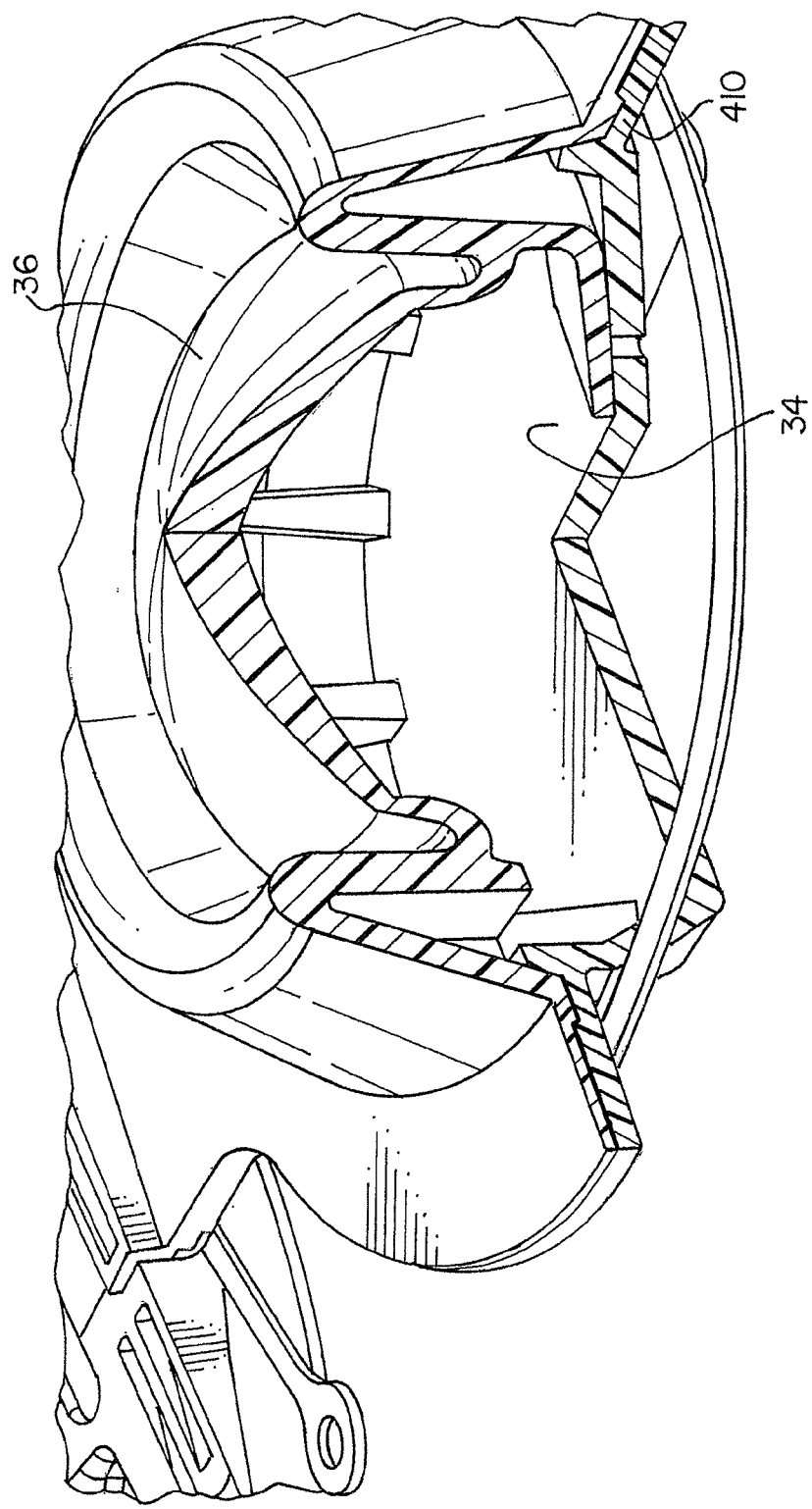
FIG. 10B is a partially exposed view of a button according to the present invention.

Button 36 and base plate 34 are connected together using a stepped flange. In the embodiment shown in FIG. 10, the thickness of the stepped flange of button 36 increases towards the periphery of button 36, and the thickness of the stepped flange of base plate 34 decreases toward the periphery of base plate 34. However, as shown in FIG. 10B it is possible to have the thickness of the stepped flange of button 36 decrease towards the periphery of button 36 and the thickness of the stepped flange of base plate 34 increases towards the periphery of base plate 34. Additionally, it is shown that there are 2 steps in the stepped flange, however, more or less than 2 steps may be incorporated without affecting the structural integrity of the heat seal.

This metered dispensing device has the advantage in that the heat sealing time is greatly reduced, which results in a substantial amount of time saved over the course of manufacturing multiple metered dispensing devices. Additionally, the substantially reduced time does not come at the cost of the structural integrity of the metered dispensing device.

It would be appreciated by those skilled in the art that various changes and modification can be made to the illustrated embodiment without departing from the spirit of the invention. All such modification and changes are intended to be covered hereby.

What is claimed is:

1. A fluid dispensing device comprising:
   a container made from a flexible material defining an interior fluid storage region;
   a flexible metering housing having a metering chamber in fluid communication with said fluid storage region, said flexible metering housing including a button with a bottom portion, said bottom portion having a first flange heat sealed to a second flange of a base plate;
   a unidirectional intake valve disposed between said container and said flexible metering housing;
   a unidirectional output valve in fluid communication with said flexible metering housing;
   said first flange including a first portion having a first thickness extending outwardly from a majority of the periphery of said bottom portion of said button and a second portion having a second thickness extending outwardly from a majority of the periphery of said first portion, said second thickness of said first flange not being equal to said first thickness of said first flange;
   said second flange of said base plate including a first portion with a first thickness and a second portion with a second thickness not equal to said first thickness;
   said first portion of said first flange being in contact with said first portion of said second flange and said second portion of said first flange being in contact with said second portion of said second flange; and
   wherein said first thickness of said first flange is less than said second thickness of said first flange.

2. The fluid dispensing device of claim 1, wherein said unidirectional intake valve and said unidirectional output valve are one-way check valves.

3. The fluid dispensing device of claim 1, wherein said button is substantially circular in shape.

4. The fluid dispensing device of claim 1, wherein said first thickness of said second flange is greater than said second thickness of said second flange.

5. The fluid dispensing device of claim 1, wherein said unidirectional output valve is connected to a fluid conduit which is connected to an exit port of the fluid dispensing device.

6. The fluid dispensing device of claim 5, wherein said output valve is on an opposite side of the container as said flexible metering housing.

7. The fluid dispensing device of claim 5, wherein said unidirectional output valve is connected to a plurality of fluid conduits, said plurality of fluid conduits connected to a plurality of exit ports.

8. A fluid dispensing device comprising:
a container made from a flexible material defining an interior fluid storage region;
a base plate connected to said container;
a substantially circular shaped button heat sealed to said base plate, said button and said base plate forming a flexible metering housing having a metering chamber in fluid communication with said fluid storage region;
a unidirectional intake valve disposed between said container and said flexible metering housing permitting flow of a fluid from said fluid storage region to said metering housing;
a unidirectional output valve in fluid communication with said flexible metering housing permitting flow of the fluid from said metering housing to an exterior of said container;
wherein said button has a stepped flange extending outwardly from a majority of the periphery of said button, said stepped flange including a first portion closest to said button having a first thickness and a second portion having a second thickness, said first thickness and said second thickness not being equal;
wherein said base plate has a stepped flange corresponding to said stepped flange of said button, said stepped flange including a first portion having a first thickness and a second portion having a second thickness, said first thickness and said second thickness not being equal;
wherein said first portion of said stepped flange of said button is in contact with said first portion of said stepped flange of said base plate;
wherein said second portion of said stepped flange of said button is in contact with said second portion of said stepped flange of said base plate; and
wherein said first thickness of said first portion of said stepped flange of said button is less than said second thickness of said second portion of said stepped flange of said button.

9. The fluid dispensing device of claim 8, wherein said unidirectional output valve is connected to a plurality of fluid conduits, said plurality of fluid conduits connected to a plurality of exit ports.

10. The fluid dispensing device of claim 8, wherein said unidirectional intake valve and said unidirectional output valve are one-way check valves.

11. The fluid dispensing device of claim 8, further comprising a strap connected to said container.

12. The fluid dispensing device of claim 8, wherein said unidirectional output valve is connected to a fluid conduit which is connected to an exit port of the fluid dispensing device.

13. The fluid dispensing device of claim 12, wherein said output valve is on an opposite side of the container as said flexible metering housing.

14. A fluid dispensing device comprising:
a container made from a flexible material defining an interior fluid storage region;
a flexible metering housing having a metering chamber in fluid communication with said fluid storage region, said flexible metering housing including a button with a bottom portion, said bottom portion having a first flange heat sealed to a second flange of a base plate;
a unidirectional intake valve disposed between said container and said flexible metering housing;
a unidirectional output valve in fluid communication with said flexible metering housing;
said first flange including a first portion having a first thickness extending outwardly from a majority of the periphery of said bottom portion of said button and a second portion having a second thickness extending outwardly from a majority of the periphery of said first portion, said second thickness of said first flange not being equal to said first thickness of said first flange;
said second flange of said base plate including a first portion with a first thickness and a second portion with a second thickness not equal to said first thickness;
said first portion of said first flange being in contact with said first portion of said second flange and said second portion of said first flange being in contact with said second portion of said second flange; and
said first flange of said button having a third portion having a third thickness extending outwardly from a majority of the periphery of said second portion, said third thickness not being equal to either said first thickness or said second thickness of said first flange.

15. A fluid dispensing device comprising:
a container made from a flexible material defining an interior fluid storage region;
a base plate connected to said container;
a substantially circular shaped button heat sealed to said base plate, said button and said base plate forming a flexible metering housing having a metering chamber in fluid communication with said fluid storage region;
a unidirectional intake valve disposed between said container and said flexible metering housing permitting flow of a fluid from said fluid storage region to said metering housing;
a unidirectional output valve in fluid communication with said flexible metering housing permitting flow of the fluid from said metering housing to an exterior of said container;
wherein said button has a stepped flange extending outwardly from a majority of the periphery of said button, said stepped flange including a first portion closest to said button having a first thickness and a second portion having a second thickness, said first thickness and said second thickness not being equal;
wherein said base plate has a stepped flange corresponding to said stepped flange of said button, said stepped flange including a first portion having a first thickness and a second portion having a second thickness, said first thickness and said second thickness not being equal;
wherein said first portion of said stepped flange of said button is in contact with said first portion of said stepped flange of said base plate;
wherein said second portion of said stepped flange of said button is in contact with said second portion of said stepped flange of said base plate; and
wherein said stepped flange of said button has a third portion having a third thickness.

16. A fluid dispensing device comprising:
a container made from a flexible material defining an interior fluid storage region;
a base plate connected to said container;
a substantially circular shaped button heat sealed to said base plate, said button and said base plate forming a flexible metering housing having a metering chamber in fluid communication with said fluid storage region;

a unidirectional intake valve disposed between said container and said flexible metering housing permitting flow of a fluid from said fluid storage region to said metering housing;

a unidirectional output valve in fluid communication with said flexible metering housing permitting flow of the fluid from said metering housing to an exterior of said container;

wherein said button has a stepped flange extending outwardly from a majority of the periphery of said button, said stepped flange including a first portion closest to said button having a first thickness and a second portion having a second thickness, said first thickness and said second thickness not being equal;

wherein said base plate has a stepped flange corresponding to said stepped flange of said button, said stepped flange including a first portion having a first thickness and a second portion having a second thickness, said first thickness and said second thickness not being equal;

wherein said first portion of said stepped flange of said button is in contact with said first portion of said stepped flange of said base plate;

wherein said second portion of said stepped flange of said button is in contact with said second portion of said stepped flange of said base plate;

wherein said first thickness of said first portion of said stepped flange of said button is greater than said second thickness of said second portion of said stepped flange of said button; and wherein said first thickness of said first portion of said stepped flange of said base plate is greater than said second thickness of said second portion of said stepped flange of said base plate.

* * * * *